United States Patent
Kawahara

(10) Patent No.: US 11,380,445 B2
(45) Date of Patent: Jul. 5, 2022

(54) TUBULAR BODY CONTAINING SIC FIBER AND METHOD FOR PRODUCING THE SAME

(71) Applicant: ADMAP Inc., Tamano (JP)

(72) Inventor: Fumitomo Kawahara, Tamano (JP)

(73) Assignee: ADMAP INC., Okayama (JP)

( * ) Notice: Subject to any disclaimer, the term of this patent is extended or adjusted under 35 U.S.C. 154(b) by 352 days.

(21) Appl. No.: 16/660,589

(22) Filed: Oct. 22, 2019

(65) Prior Publication Data

US 2020/0139662 A1     May 7, 2020

(30) Foreign Application Priority Data

Nov. 1, 2018    (JP) .............................. JP2018-206259

(51) Int. Cl.
    *G21C 3/07*       (2006.01)
    *B32B 1/08*       (2006.01)
    (Continued)

(52) U.S. Cl.
    CPC .................. *G21C 3/07* (2013.01); *B32B 1/08* (2013.01); *B32B 3/30* (2013.01); *B32B 5/02* (2013.01);
    (Continued)

(58) Field of Classification Search
    CPC .. B32B 1/08; B32B 3/26; B32B 3/263; B32B 33/30; B32B 5/02; B32B 5/028; B32B 5/12; B32B 18/00; B32B 2262/105; B32B 2307/302; B32B 2307/306; B32B 2307/50; B32B 2307/714; B32B 2597/00; F16L 9/00; F16L 9/04; F16L 9/042;
    (Continued)

(56) References Cited

U.S. PATENT DOCUMENTS 9,548,139 B2 *   1/2017   Zabiego ................ C04B 37/021
2006/0039524 A1    2/2006   Feinroth et al.
2017/0314587 A1   11/2017   Takagi

FOREIGN PATENT DOCUMENTS

JP        2002-089757 A     3/2002
JP        2008501977 A      1/2008
               (Continued)

OTHER PUBLICATIONS

Office Action in the corresponding Korean Patent Application No. 10-2019-0134398, dated Feb. 16, 2021.

(Continued)

*Primary Examiner* — Walter Aughenbaugh
(74) *Attorney, Agent, or Firm* — Global IP Counselors, LLP

(57) ABSTRACT

A first SiC layer formed into a tubular shape and made of a SiC material, a first groove which spirals in one direction along the outer periphery of the first SiC layer, a first SiC fiber layer made of a plurality of SiC fibers wound along the first groove, a second SiC fiber layer made of a plurality of SiC fibers wound outside of the first SiC fiber layer in a direction different from the one direction, and a second SiC layer which is made of a SiC material and which covers the first SiC layer, the first SiC fiber layer, and the second SiC fiber layer are provided. The first SiC fiber layer and the second SiC fiber layer are separated from each other at intersections of the first SiC fiber layer and the second SiC fiber layer.

8 Claims, 4 Drawing Sheets

(51) Int. Cl.
  *F16L 9/04* (2006.01)
  *B32B 5/02* (2006.01)
  *C04B 35/565* (2006.01)
  *B32B 3/30* (2006.01)
  *B32B 5/12* (2006.01)
  *B32B 18/00* (2006.01)
  *C04B 41/87* (2006.01)
(52) U.S. Cl.
  CPC .............. *B32B 5/12* (2013.01); *C04B 35/565* (2013.01); *F16L 9/042* (2013.01); *B32B 18/00* (2013.01); *C04B 41/87* (2013.01)
(58) Field of Classification Search
  CPC ... F16L 9/045; F16L 9/10; G21C 3/06; G21C 3/07; C04B 35/565; C04B 35/571; C04B 35/573; C04B 35/575; C04B 35/5755; C04B 41/87; C04B 2235/5244; C04B 2235/614; C04B 2235/616
  See application file for complete search history.

(56) References Cited

FOREIGN PATENT DOCUMENTS

| | | |
|---|---|---|
| JP | 2016016603 A | 2/2016 |
| JP | 2016088826 A | 5/2016 |
| JP | 2020029373 A | 2/2020 |
| KR | 10-0877757 B1 | 12/2008 |
| KR | 101189170 B1 | 10/2012 |
| WO | 2016002913 A1 | 1/2016 |
| WO | 2016002914 A1 | 1/2016 |

OTHER PUBLICATIONS

Office Action of the corresponding Japanese Patent Application No. 2018-206259 dated Nov. 4, 2020.
Search Report of the corresponding European Patent Application No. 19205304.9 dated Mar. 2, 2020.

* cited by examiner

TUBULAR BODY CONTAINING SIC FIBER AND METHOD FOR PRODUCING THE SAME

CROSS-REFERENCE TO RELATED APPLICATIONS

This application claims priority to Japanese Patent Application No. 2018-206259, filed on Nov. 1, 2018. The entire disclosure of Japanese Patent Application No. 2018-206259 is hereby incorporated herein by reference.

BACKGROUND

Technical Field

The present invention relates to a tubular body containing SiC fibers and a method for manufacturing the same

Background Information

SiC (silicon carbide) has been proposed as a material for tubular bodies used in special environments and extreme environments where high durability is required such as in the fields of nuclear power and aerospace. SiC material s have excellent heat resistance and chemical stability, they have high thermal conductivity and mechanical strength, they are light in weight, and they have good neutron economy and low reactivity with high-temperature water. For these reasons, it is expected that a nuclear fuel cladding tube which is safer and more efficient than a conventional zircaloy (zirconium alloy) will be obtained by using a tubular body containing a SiC-based material as a nuclear fuel cladding tube, for example.

In order to improve the resistance to twisting or the like, a tubular body formed of a composite material containing SiC fibers has been proposed. In the tubular body described in JP-A-2016-16603 (Patent Document 1), a yarn in which a plurality of SiC fibers are bundled is woven to form an aggregate. A SiC precursor is applied to the assembled aggregate and then fired to form a SiC layer. The SiC layer which is formed is further subjected to chemical vapor deposition (hereinafter referred to as the CVD method) to form a CVD-SiC layer.

SUMMARY

However, the tubular body of Patent Document 1 includes a first yarn and a second yarn. The first yarn and the second yarn are alternatingly assembled under and over each other (see FIG. 3 of Patent Document 1). When the yarn is assembled alternatingly under and over each other as described above, the yarns are in intimate contact with each other in the area where the yarns overlap each other. If the yarns are in intimate contact with each other, the SiC material may not be sufficiently filled between the SiC fibers forming the yarns. If the SiC precursors are insufficiently filled, many voids remain, thermal conductivity is deteriorated, and the energy efficiency of the tubular body is lowered.

The present invention has been made in order to solve the above-mentioned problems, and an object of the present invention is to provide a tubular body containing SiC fibers having a high thermal conductivity and a process for manufacturing the same.

As a first aspect for solving the above problems, a tubular body containing SiC fibers comprises a first SiC layer made of a SiC material and formed into a tubular shape, a first groove which spirals in one direction along the outer periphery of the first SiC layer, a first SiC fiber layer containing a plurality of SiC fibers wound along the first groove, a second SiC fiber layer containing a plurality of SiC fibers wound outside the first SiC fiber layer in a direction different from the one direction, and a second SiC layer made of a SiC material and covering the first SiC layer, the first SiC fiber layer, and the second SiC fiber layer. The first SiC fiber layer and the second SiC fiber layer are separated from each other at intersections of the first SiC fiber layer and the second SiC fiber layer. The cross section of the tubular shape may be circular or polygonal.

In this aspect, a first SiC fiber layer is provided along a first groove. Therefore, the winding of the bundle of SiC fibers can be controlled, so variations in the position and thickness of the first SiC fiber layer with respect to the tubular body can be suppressed. As a result, it is easy to separate the second SiC fiber layer which is located on the outer side of the first SiC fiber layer from the first SiC fiber layer according to the position and the thickness of the first SiC fiber layer. Therefore, the first SiC fiber layer and the second SiC fiber layer do not intimately contact each other, and SiC which forms the second SiC layer is easily filled between the first SiC fiber layer and the second SiC fiber layer when the second SiC layer is formed. As a result, voids can be prevented from remaining between SiC fibers, and a tubular body containing SiC fibers having a higher thermal conductivity can be provided. In addition, the use of monolithic SiC containing SiC fibers in SiC materials for the tubular body can prevent brittle fracture of the SiC composites and provide a tubular body without continuous non-catastrophic fracture which can occur in a tubular body made only of monolithic SiC. That is, a tubular body with enhanced combined effects can be provided.

In the second aspect, the thickness of the first SiC fiber layer may be smaller than the depth of the first groove, and the edge part of the first groove may be formed by a curved surface.

In this aspect, the thickness of the first SiC fiber layer is less than the depth of the first groove, so the first SiC fiber layer and second SiC fiber layer can be reliably spaced from each other. When the SiC fibers are wound in the first groove, the SiC fibers can be prevented from being caught by the edge portions of the first groove. As a result, the first SiC fiber layer and the second SiC fiber layer can be more reliably kept separated from each other.

In the third aspect, a second groove may spiral along the outer periphery of the first SiC layer in a direction different from the one direction and with a depth shallower than that of the first groove, and the second SiC fiber layer may be formed of a plurality of SiC fibers wound along the second groove.

In this aspect, a second groove having a depth shallower than that of the first groove can be provided in addition to the first groove. This makes it possible to control the winding of the bundles of the two SiC fibers. As a result, the first SiC fiber layer and the second SiC fiber layer can be reliably kept separated from each other.

In a fourth aspect, the first SiC layer may be sintered SiC. SiC is easy to process in a solid state before sintering. By processing and forming the first groove prior to sintering, the manufacturing costs of forming the first groove can be reduced. As a result, it is possible to provide a low-cost tubular body containing SiC fibers having a high thermal conductivity.

A fifth aspect can be employed as a method of manufacturing the above-mentioned tubular body containing SiC fibers.

In the fifth aspect, a method for manufacturing a tubular body containing SiC fibers may comprise a step of forming SiC materials into a tubular shape and spirally forming a first groove along the tubular shape, a step of forming a first SiC fiber layer containing a plurality of SiC fibers along the first groove, a step of forming a second SiC fiber layer spaced from the first SiC layer on the outer side of the first SiC fiber layer, and a step of forming a second SiC layer covering the first SiC layer, the first SiC fiber layer, and the second SiC fiber layer.

In this aspect, the first SiC fiber layer is formed of SiC fibers along the first groove. The second SiC fiber layer is formed with a separation from the first SiC fiber layer. The second SiC layer fills the gaps separating the first SiC fiber layer and the second SiC fiber layer, and covers the first SiC layer, the first SiC fiber layer and the second SiC fiber layer. This can prevent many voids from remaining between the SiC fibers. As a result, it is possible to provide a method of manufacturing a tubular body containing SiC fibers having a high thermal conductivity.

DETAILED DESCRIPTION OF EMBODIMENTS

Embodiments of the present invention will be described below with reference to the drawings.

(1) Overall Structure

Figure 1:
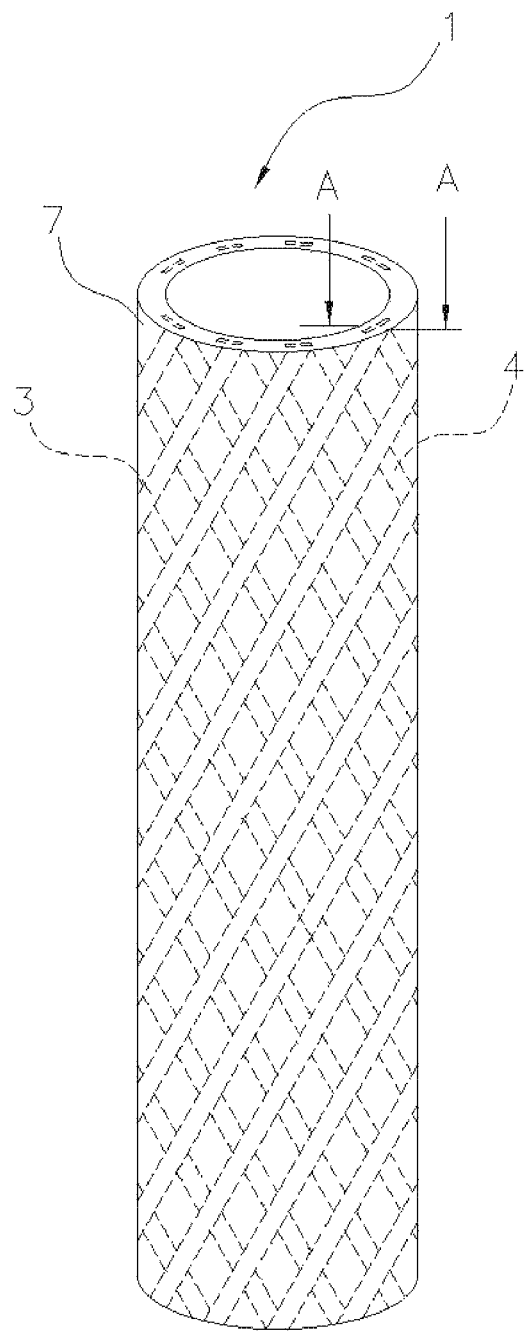
FIG. 1 is a perspective view showing the structure of a tubular body containing SiC fibers.
Figure 2:
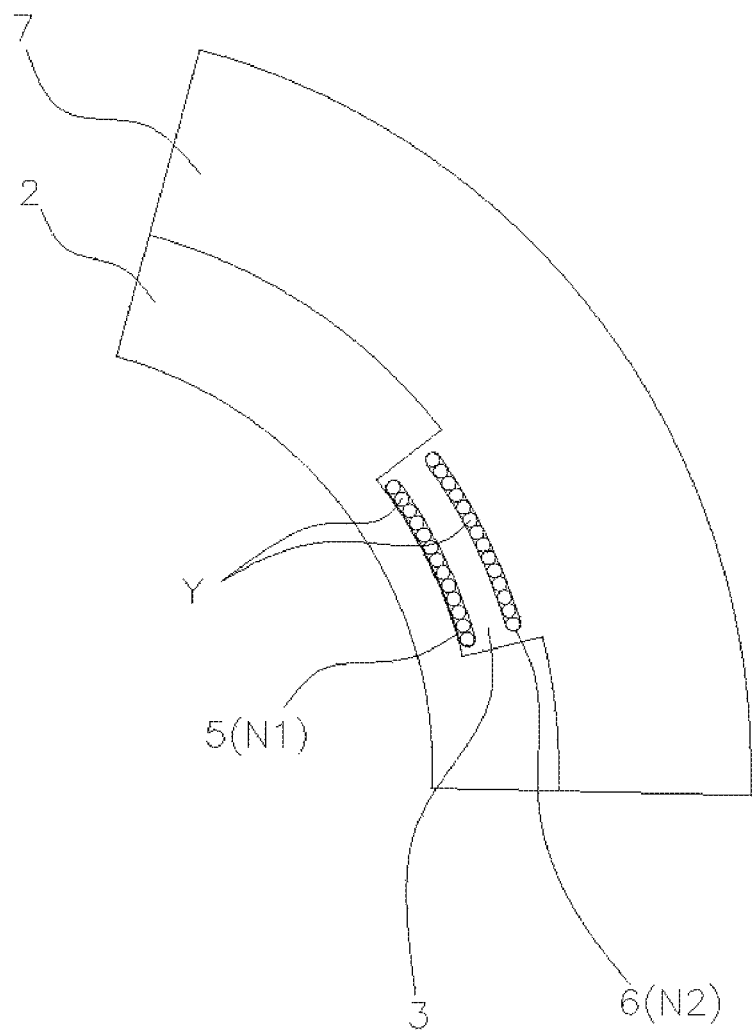
FIG. 2 is a cross-sectional view taken along section A-A of a tubular body containing SiC fibers.

FIG. 1 is a perspective view showing the structure of a tubular body 1 containing SiC fibers. FIG. 2 is a cross-sectional view taken along line A-A of a tubular body containing SiC fibers. The A-A cross section of FIG. 2 is a cross section where a first SiC fiber layer 5 and a second SiC fiber layer 6, which will be described later, intersect with each other. As shown in FIGS. 1 and 2, the tubular body 1 includes a first SiC layer 2, a plurality of first grooves 3, and a plurality of second grooves 4 provided along the outer periphery of the first SiC layer 2 (see the broken line in FIG. 1), a first SiC fiber layer 5 made of a plurality of SiC fibers Y provided along the first grooves 3, a second SiC fiber layer 6 containing a plurality of SiC fibers Y provided along the second grooves 4, and a second SiC layer 7. In the present embodiment, if the tubular body 1 is a nuclear fuel cladding tube, the sum of the thickness of the first SiC layer 2 and the thickness of the second SiC layer 7 is about 1 mm.

Figure 3:
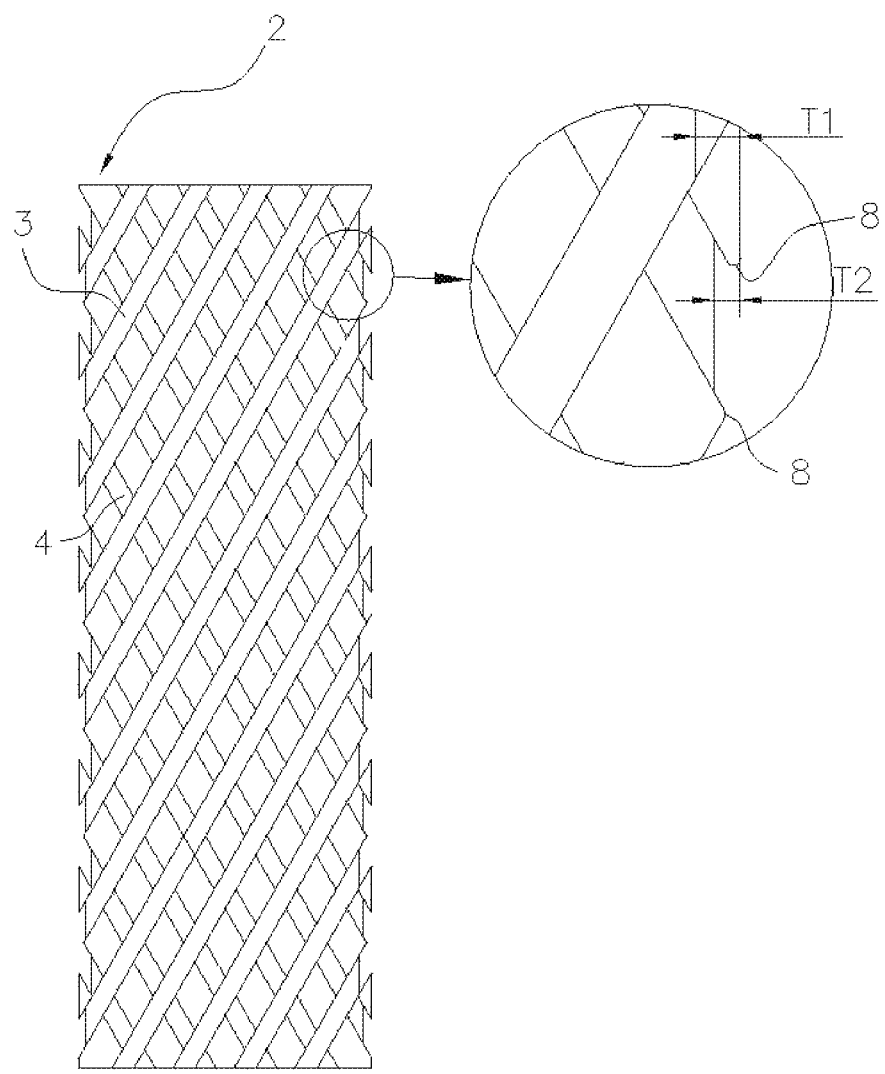
FIG. 3 is a side view of a first SiC layer according to the present invention and an enlarged view of a first groove and a second groove.

FIG. 3 is a side view of the first SiC layer 2. The enlarged view of FIG. 3 is an enlarged view of one of the first grooves 3 and one of the second grooves 4. As shown in FIG. 3, the first SiC layer 2 is a tubular body made of SiC. The thickness of the first SiC layer 2 is, for example, about 500 μm. In the present embodiment, the first SiC layer 2 is formed of a sintered SiC material having excellent workability.

The first grooves 3 and the second grooves 4 are provided on the outer periphery of the first SiC layer 2. The first grooves 3, which have a depth T1, spiral in one direction (clockwise in this embodiment) from one end to the other end of the first SiC layer 2 with a uniform width along the outer periphery of the tubular shape. In the first grooves 3, a yarn (strand) N1 formed by bundling a plurality of SiC fibers Y is wound along the first grooves 3 to form the first SiC fiber layer 5. As an illustration, the thickness of yarn N1 may be between 50 μm and 200 μm, while the depth T1 of the first grooves 3 may be on the order of 300 μm, which is bigger than the thickness of yarn N1. The edge portion of the first grooves 3 is provided with a fillet 8 to prevent the SiC fibers from becoming caught in the edge portion when the SiC fibers are wound.

The second grooves 4 are formed with a depth T2 which is shallower than the depth T1 of the first grooves 3, and they spiral from one end to the other end of the first SiC layer 2 in a direction (counterclockwise in this embodiment) different from the direction of the first grooves 3 with a uniform width. In the second grooves 4, a yarn (strand) N2 formed by bundling a plurality of SiC fibers Y is wound along the second grooves 4 to form a second SiC fiber layer 6. Like the first grooves 3, the edge portion of the second grooves 4 is provided with a fillet 8 to prevent the SiC fibers from being caught by the edge portion when the SiC fibers are wound.

The depth T2 of the second grooves 4 is set such that the bottom of the second grooves 4 does not contact the surfaces of yarn N1 when yarn N1 is wound in the first grooves 3. For example, if the depth of the first grooves 3 is 300 μm and the thickness of yarn N1 is 100 μm, then if the depth T2 is made 100 μm, the distance between the bottom of the second grooves 4 and the surface of yarn N1 wound in the first grooves 3 becomes 100 μm, and the bottom of the second grooves 4 and the surface of yarn N1 wound in the first grooves 3 are separated from each other. Thus, where the bottom of the second grooves 4 is set so as not to touch the surfaces of yarn N1 wound in the first grooves 3, there is a gap between yarn N1 and yarn N2 at the intersection of yarn N1 and yarn N2 (see FIG. 2). The first SiC fiber layer 5 and the second SiC fiber layer 6 can be formed with a separation between each other by filling the gap with the SiC material forming the second SiC layer 7, which will be described later. In addition, since the SiC material is filled in the gap, the SiC material is also filled between the plurality of SiC fibers forming yarn N1 and yarn N2, and it is possible to prevent a large amount of voids from remaining between the SiC fibers. The shapes of the first grooves 3 and the second grooves 4 are not limited to those described above, and, for example, the widths of the first grooves 3 and the second grooves 4 may be different from each other or may be nonuniform. That is, it is sufficient for the depth T1 of the first grooves 3 to be deeper than the depth T2 of the second grooves 4.

The second SiC layer 7 covers the first SiC layer 2, the first SiC fiber layer 5, and the second SiC fiber layer 6. In the present embodiment, the second SiC layer 7 is a layer made of a CVD-SiC material on which a SiC film is formed by the CVD method. However, the present invention is not limited to this, and the SiC film may be formed by various methods such as the MI (Melt Infiltration) method, the PIP method (Polymer Infiltration and Pyrolysis) method, the CVI (Chemical Vapor Infiltration) method, or the PVD (Physical Vapor Deposition) method. The thickness of the second SiC layer 7 is, for example, about 500 μm.

(2) Manufacturing Method

Figure 4:
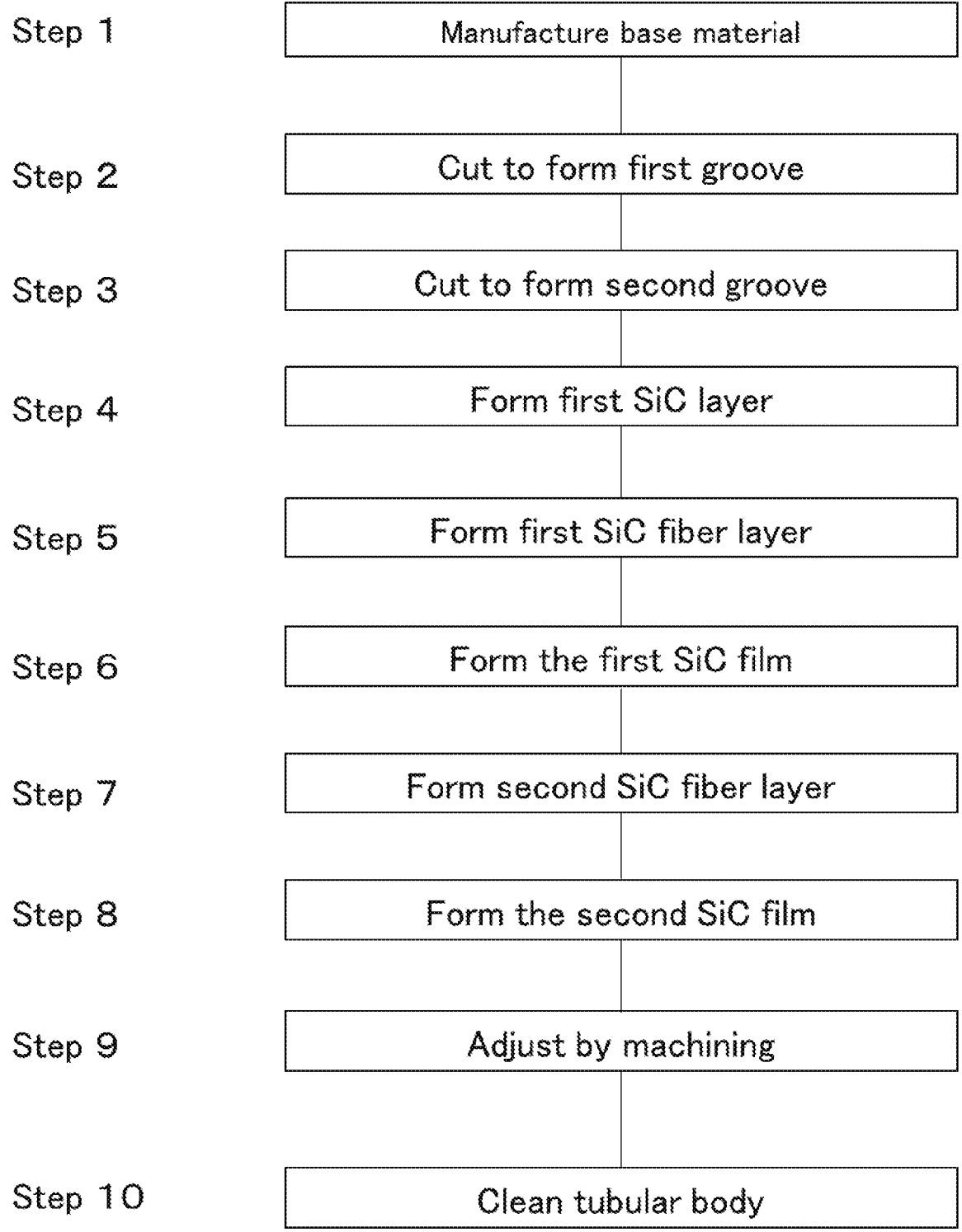
FIG. 4 is a flow chart showing a process of manufacturing of a tubular body containing SiC fibers according to the present invention.

FIG. 4 is a diagram showing steps of manufacturing a tubular body containing SiC fibers in the present embodiment. First, a green body which becomes a tube-shaped sintered SiC base material is manufactured by extrusion molding in Step 1. Then, the molded green body is cut to form the first grooves 3 and second grooves 4 in Steps 2 and 3. The first grooves 3 and the second grooves 4 may be formed at the same time during the extrusion molding.

Next, the green body in which the first grooves 3 and the second grooves 4 were formed is sintered at 2200° C. in an inert atmosphere to form the first SiC layer 2 (Step 4). Then, yarn N1 formed by bundling a plurality of SiC fibers Y is wound along the first grooves 3 to form the first SiC fiber layer 5 (Step 5).

Next, a first SiC film is optionally formed by the CVD method on the first SiC layer 2 on which yarn N1 is wound. Then, if necessary, the outer shape is adjusted by cutting or the like. The second grooves 4 may be formed when the outer shape is adjusted (Step 6).

Next, yarn N2 formed by bundling a plurality of SiC fibers Y is wound along the second grooves 4 to form a second SiC fiber layer 6 (Step 7). Then, a second SiC film is formed on the entire outer surface of the first SiC layer 2 around which yarn N2 is wound by the CVD method to form a second SiC layer 7 (Step 8). Then, the outer shape (diameter, length, etc.) of the tubular body is adjusted by machining (cutting, severing, etc.) (Step 9). Finally, the tubular body is ground, polished, chamfered, and cleaned (Step 10).

(3) Variations

Needless to say, embodiments of the present invention are not limited to the above-mentioned examples and may take various forms as long as they fall within the technical scope of the present invention.

For example, although the second grooves 4 have been described in the above embodiment, the second grooves 4 need not be provided. That is, after yarn N1 is wound along the first grooves 3, a first SiC film may be formed and the outer shape of the SiC film may be adjusted, and then yarn N2 may be wound around the outer periphery of the first SiC layer 2. This eliminates the need for cutting the second grooves 4. As a result, it is possible to provide a tubular body containing SiC fibers at a lower cost.

In the above embodiment, a method of manufacturing a tubular body having two SiC fiber layers has been described, but three or more SiC fiber layers can also be formed. By superimposing SiC fiber layers in this manner, the strength of the tubular body can be improved.

In the above embodiment, the tubular body 1 has been described using various numerical values as a nuclear fuel cladding tube, but the present invention is not limited thereto. The present invention may be used for tubular body applications other than nuclear cladding. In addition, a tubular body may have numerical values which differ from those used in the present embodiment as appropriate.

In the above embodiment, after the first SiC fiber layer 5 is formed, then the first SiC film is formed, the second SiC fiber layer 6 is formed, and then the second SiC film (namely, the second SiC layer 7) is formed, but the present invention is not limited thereto. The second SiC fiber layer 6 may be formed simultaneously with the formation of the first SiC fiber layer 5, and then a single SiC film may be formed to create the second SiC layer 7. Even in such a case, the first SiC fiber layer 5 and the second SiC fiber layer 6 do not intimately contact each other, and SiC which forms the second SiC layer 7 is easily filled between the first SiC fiber layer 5 and the second SiC fiber layer 6 when the second SiC layer is formed.

(4) Effects

With such a configuration, the positions of yarn N1 and yarn N2 can be controlled by the first grooves 3 and the second grooves 4. As a result, a gap is formed between yarn N1 and yarn N2 where yarn N1 and yarn N2 intersect with each other, and the gap is filled with a SiC material to form the second SiC layer 7. That is, the first SiC fiber layer 5 and the second SiC fiber layer 6 can be provided with a separation between them. Therefore, the SiC material can easily fill the gaps between the plurality of SiC fibers Y forming yarn N1 and yarn N2, and a large amount of voids can be prevented from remaining between the SiC fibers. As a result, it is possible to provide a method of manufacturing a tubular body containing SiC fibers having a high thermal conductivity.

EXPLANATION OF REFERENCE NUMERALS

1 . . . Tubular body containing SiC fibers,
2 . . . First SiC layer,
3 . . . First groove,
4 . . . Second groove,
5 . . . First SiC fiber layer,
6 . . . Second SiC fiber layer,
7 . . . Second SiC layer,
8 . . . Fillet (curved surface)

What is claimed is:

1. A tubular body containing SiC fibers comprising:
   a first SiC layer made of a SiC material and formed into a tubular shape;
   a first groove which spirals in one direction along an outer periphery of the first SiC layer;
   a first SiC fiber layer containing a plurality of SiC fibers wound along the first groove;
   a second SiC fiber layer containing a plurality of SiC fibers wound outside the first SiC fiber layer in a direction different from the one direction; and
   a second SiC layer of a SiC material covering the first SiC layer, the first SiC fiber layer, and the second SiC fiber layer,
   wherein the first SiC fiber layer and the second SiC fiber layer are separated from each other at an intersection of the first SiC fiber layer and the second SiC fiber layer.

2. The tubular body containing SiC fibers according to claim 1, wherein:
   a thickness of the first SiC fiber layer is smaller than a depth of the first groove, and edge portions of the first groove are formed with curved surfaces.

3. The tubular body containing SiC fibers according to claim 1, further comprising:
   a second groove which spirals along the outer periphery of the first SiC layer in a direction different from the one direction and having a depth shallower than that of the first groove, the second SiC fiber layer containing a plurality of SiC fibers wound along the second groove.

4. The tubular body containing SiC fibers according to claim 2, further comprising:
   a second groove which spirals along the outer periphery of the first SiC layer in a direction different from the one direction and having a depth shallower than that of the first groove,
   the second SiC fiber layer containing a plurality of SiC fibers wound along the second groove.

5. The tubular body according to claim 1, wherein the first SiC layer is sintered SiC.

6. The tubular body according to claim 2, wherein the first SiC layer is sintered SiC.

7. The tubular body according to claim 3, wherein the first SiC layer is sintered SiC.

8. The tubular body according to claim 4, wherein the first SiC layer is sintered SiC.

\* \* \* \* \*